(12) United States Patent
Bos et al.

(10) Patent No.: US 7,437,928 B2
(45) Date of Patent: Oct. 21, 2008

(54) FLOW SENSOR OF THE THERMAL TYPE

(75) Inventors: Jeroen Wouter Bos, Zevenaar (NL);
Ronald Wilhelmus Johannes Hoitink, Beltrum (NL); Johannes Henricus Besseling, Ruurlo (NL); Joost Conrad Lötters, Ruurlo (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 11/798,983

(22) Filed: May 18, 2007

(65) Prior Publication Data

US 2007/0295079 A1 Dec. 27, 2007

(30) Foreign Application Priority Data

Jun. 14, 2006 (NL) .................................... 1032007

(51) Int. Cl.
*G01F 1/68* (2006.01)

(52) U.S. Cl. .................................. 73/204.22

(58) Field of Classification Search .............. 73/204.22, 73/202.5, 204.12, 204.23, 204.25, 204.27
See application file for complete search history.

(56) References Cited

U.S. PATENT DOCUMENTS

| 4,517,838 | A | | 5/1985 | Wachi et al. |
| 4,815,280 | A | | 3/1989 | Tujimura et al. |
| 5,191,793 | A | * | 3/1993 | Drexel et al. .............. 73/204.22 |
| 5,279,154 | A | * | 1/1994 | Vavra et al. ................. 73/202.5 |
| 5,309,762 | A | * | 5/1994 | Satoh et al. ............... 73/204.22 |

FOREIGN PATENT DOCUMENTS

| EP | 0809 090 A1 | 11/1997 |
| WO | 03/058180 A1 | 7/2003 |

* cited by examiner

*Primary Examiner*—Jewel V Thompson
(74) *Attorney, Agent, or Firm*—Young & Thompson

(57) ABSTRACT

A flow sensor of the thermal type having a U-shaped sensor tube with two legs and a connecting limb with two adjoining electrical resistance elements, and with a housing. The sensor tube has an inlet side and an outlet side. The housing has a first and a second housing part of a thermally well-conducting material, each with an inner surface provided with cavities and with an outer surface. The housing parts are placed with their inner surfaces against each other, while the U-shaped sensor tube has a main surface that extends parallel to the inner surfaces. The housing parts surround the connecting limb and the legs of the U-shaped sensor tube such that the sensor tube is thermally clamped in between the housing parts in two locations: a first location situated between its inlet side and the upstream resistance element, and a second location situated between its outlet side and the downstream resistance element.

12 Claims, 4 Drawing Sheets

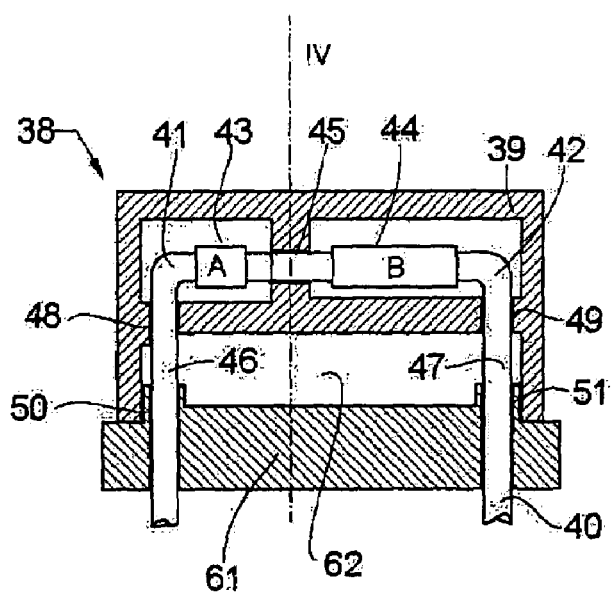 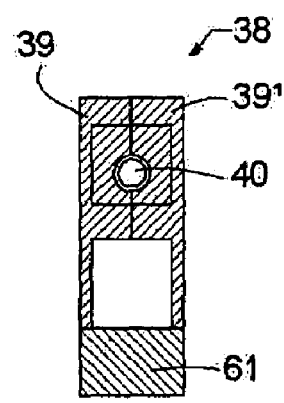
FIG.4A  FIG.4B
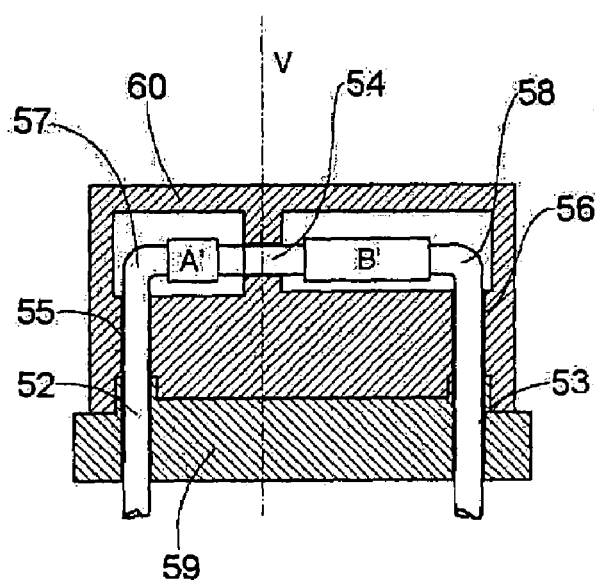 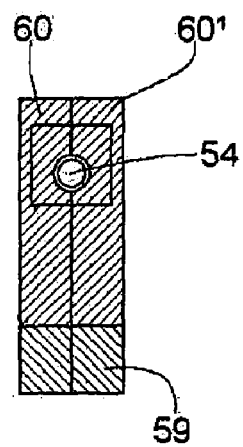
FIG.5A  FIG.5B

FLOW SENSOR OF THE THERMAL TYPE

The invention relates to a flow sensor of the thermal type having a U-shaped sensor tube with two legs and a connecting limb with two adjoining electrical resistance elements, and with a housing, which sensor tube has an inlet side where flow enters and an outlet side where flow exits.

A flow sensor as described above is known from WO 03058180. The flow sensor described therein comprises a U-shaped (capillary) sensor tube with a housing that is mounted on a base having two bores through which the legs of the U extend, said housing forming a chamber around exclusively that portion of the connecting limb of the U that supports the resistance elements.

Thermal flowmeters with flow sensors having a capillary tube utilize the fact that heat transfer from the tube wall to a fluid (gas or liquid) flowing in the tube is a function of the mass flow rate, the difference between the fluid temperature and the wall temperature, and the specific heat capacity of the fluid. A wide variety of flow sensor configurations is used in mass flow controllers. A particular type of construction, for example, involves the use of a stainless steel flow tube with two or more resistance elements in thermally conductive contact with the flow tube. The resistance elements are typically manufactured from a material that has a high temperature coefficient of resistance. Each of the elements can act as a heater, as a temperature detector, or as both. At least one resistance element (the heater) is energized with an electric current so as to supply heat to the flow of fluid through the tube. When two heaters are energized with a constant power, the mass flow rate of the fluid through the tube can be derived from the temperature differences between the resistance elements. In an alternative method, a first resistance element in a first position acts as a heater and as a temperature detector, and a second resistance element located in a second position upstream of the first position acts as a temperature detector. A control circuit serves to keep the temperature difference between the resistance elements at a fixed, predetermined value, the mass flow rate of the fluid flowing through the tube then being derived from data of the control circuit. This measuring method is known as the Constant Temperature (CT) method.

The invention, however, is also suitable for use with the TB (Thermal Balancing) method as described in EP 1 477 779.

It is a problem with the measuring methods and systems mentioned above that inaccuracies in the measuring signal may occur in the case of a comparatively low flow rate through the tube. The inventors ascribe this to the fact that thermal mass flowmeters are often used in surroundings where temperature gradients may arise across (portions of) the sensor tube and/or across the resistance elements. In the construction known from WO 03058180 cited above, for example, the legs and the bends that join the legs to the connecting limb extend beyond the housing.

The invention has for its object to provide a flow sensor of the type mentioned in the opening paragraph which opposes the influence of external temperature gradients so as to achieve that no or at least as small as possible a temperature gradient arises not only across the operational segment of the tube, i.e. the portion situated between the sides of the resistance elements that face away from one another, but also across the legs (and the bends joining the legs to the connecting limb) during operation.

According to the invention, a flow sensor of the kind mentioned in the opening paragraph is for this purpose characterized in that the housing comprises a first and a second housing part of a thermally well-conducting material, each with an inner surface provided with cavities and with an outer surface, which housing parts are placed with their inner surfaces against each other, while the U-shaped sensor tube has a main surface that extends parallel to the inner surfaces, and the housing parts surround the connecting limb and the legs of the U-shaped sensor tube wherein said sensor tube is locally thermally clamped in between the housing parts in a first location situated between its inlet side and the upstream resistance element and is locally thermally clamped in between the housing parts in a second location situated between its outlet side and the downstream resistance element.

It is found that the problem of temperature gradients arising across (portions of) the sensor tube can be solved to a high degree in that the sensor tube is locally thermally clamped in between two housing parts made of a thermally well-conducting material, such that the housing surrounds the connecting limb with the two electrical resistance elements, the bends, and the legs of the sensor tube. To achieve a good operation, a preferred embodiment is characterized in that the U-shaped sensor tube lies free between the housing parts between its inlet side and the upstream resistive element and between its outlet side and the downstream resistive element except for the locations where it is thermally clamped in.

An embodiment which has the advantage of an effective thermal clamping-in is characterized in that the cavities in the inner surface of the first housing part and the cavities in the inner surface of the second housing part constitute channels that correspond with one another two-by-two, said channels being shallower in those locations where the sensor tube is thermally clamped in than they are elsewhere.

The portion of the sensor tube lying between the portions of the electrical resistance elements that face away from one another (i.e. the operational segment of the sensor tube) can be located in mutually facing channels in the inner surfaces of dimensions such that the tube (with windings) lies free of the housing parts.

If the cavities (channels) are so wide that a flow of air can occur around the operational tube segment during operation (denoted the chimney effect), however, it may be advisable to provide polystyrene foam in the space surrounding this tube portion. A disadvantage of this is, however, that it is found to counteract a fast operation of the sensor.

A further embodiment is accordingly characterized in that the connecting limb of the U-shaped sensor tube with the resistance elements provided thereon is narrowly enclosed by the mutually facing cavities, i.e. channels, in the inner surfaces of the housing parts.

The fact that the channels narrowly enclose the tube with windings serves to ensure that the air around the tube is stationary during operation, so that no heat flow around the sensor (giving rise to the so-termed chimney effect) will occur.

An embodiment of the clamping-in is characterized in that the U-shaped sensor tube is locally thermally clamped in between the housing parts adjacent or at the transitions from the legs to the connecting limb (i.e. the bends). In other words: the clamping-in of the U-shaped sensor tube takes place at the areas of the bends or adjacent the bends. If the clamping-in takes place adjacent the bends, this may be at the sides facing the operational segment, but preferably such clamping-in takes place at the sides of the bends facing away from the operational segment.

Another embodiment of the clamping-in is characterized in that the U-shaped sensor tube is locally thermally clamped in between the housing parts adjacent its inlet side and its outlet side. The occurrence of temperature gradients adjacent the inlet and outlet sides of the sensor tube is thus avoided. This is important especially where thicker tubes are used.

An additional problem in measuring systems operating according to the CT principle is that an (undesirable) dip in the measuring signal occurs when there is a comparatively low rate of flow through the tube.

To prevent this dip, a further embodiment is characterized in that in addition the connecting limb of the U-shaped sensor tube is thermally clamped in between the housing parts in a location between the two electrical resistance elements. This embodiment is of special importance in cases in which thermal clamping-in takes place in or adjacent the bends, in particular in combination with resistance elements of unequal values.

The provision of a thermal contact between the tube and the housing parts in a location between the two resistance elements ensures that in this location any heat generated by the heater and flowing through the tube wall is discharged towards the housing, so that it cannot reach the upstream temperature detector, i.e. cannot adversely influence the latter. The dip mentioned above is caused by such undesirable influences.

An additional feature of the invention is the characteristic that each housing part comprises a base portion, and that the legs of the sensor tube are passed to the exterior through cavities arranged two-by-two opposite one another in said base portions. This embodiment renders possible an automated manufacture of the sensor as well as an automated placement of the sensor on a base construction of a mass flow controller.

A further step towards automation is characterized in that the first and the second housing part are manufactured from a metal alloy by means of die casting. Die casting of the housing parts renders any grinding and/or cutting of the housing parts unnecessary.

Some embodiments of the invention will now be explained in more detail by way of example with reference to the drawings, in which:

FIG. 4A is a diagrammatic longitudinal sectional view of a two-part housing 38 for a flow sensor according to the invention;

FIG. 4B is a cross-sectional view taken on the line IV in FIG. 4A;

FIG. 5A is a longitudinal sectional view of an alternative housing for a flow sensor according to the invention; and FIG. 5B is a cross-sectional view taken on the line V in FIG. 5A.

Figure 1:
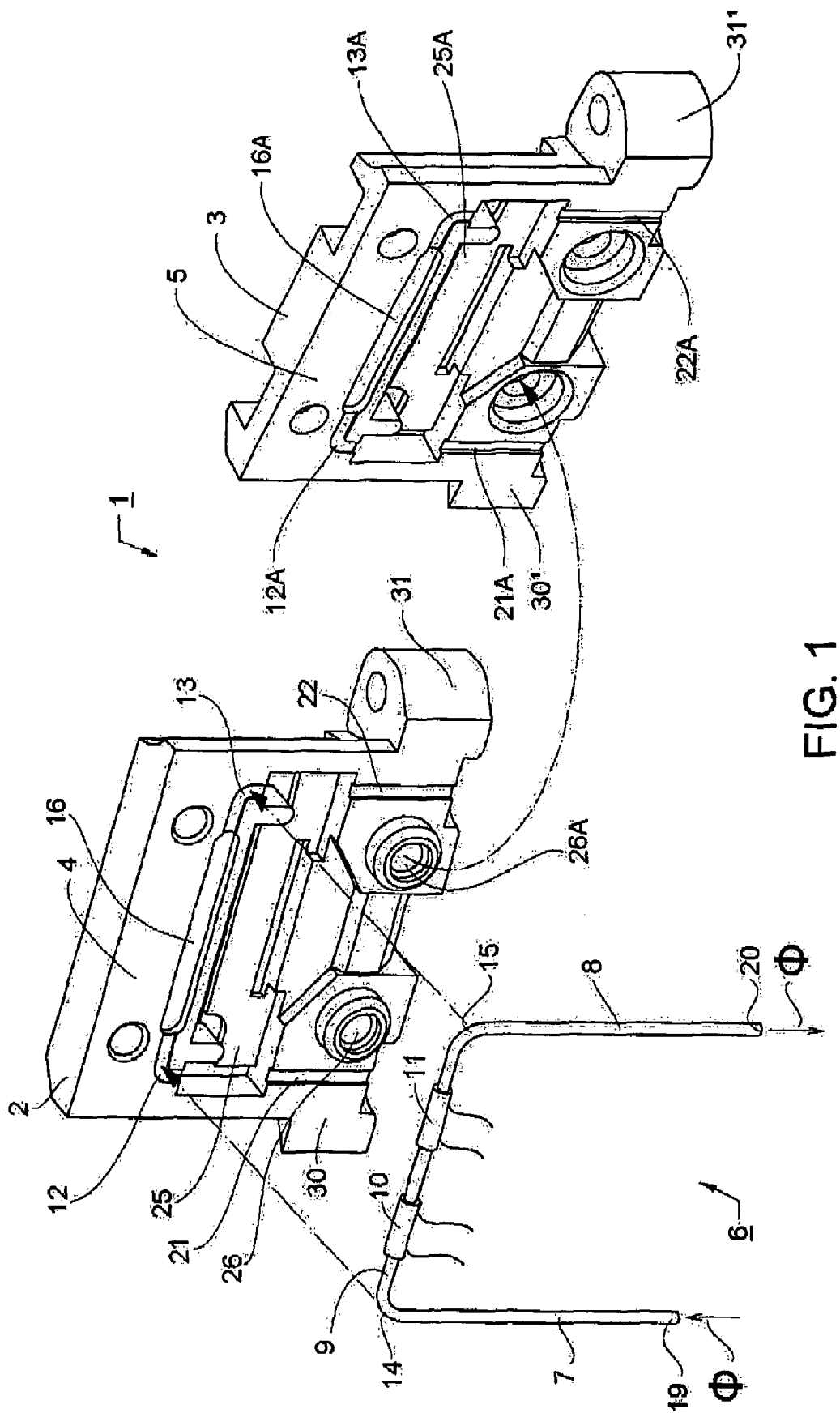
FIG. 1 is an exploded perspective view of the sensor tube and the two housing parts of a flow sensor according to the invention.

The exploded view of FIG. 1 shows the main components of a flow sensor 1 according to the invention. The flow sensor 1 comprises a first housing part 2 and a second housing part 3. The housing parts 2, 3 may be manufactured from a thermally well-conducting metal alloy, such as a zinc-aluminum alloy, by means of a die casting technique. The parts 2 and 3 fit in/on one another upon assembly, i.e. the inner surfaces 4 and 5 thereof lie on top of one another. They are centered by means of mortise and tenon joints. In the present case the tenons are formed by ridges 26, 26A on the inner surface of the housing part 2, and the mortises are formed by the openings in the housing part 3 that match the ridges. This renders it possible to carry out an automation process whereby the housing parts are supplied on a tray, the sensor tube is placed in one of the housing parts, and the housing parts are snapped into one another by means of a robot.

Reference numeral 6 denotes a sensor tube. This is a single-part capillary tube of stainless steel in this example with an external diameter of 0.3 mm and an internal diameter of 0.2 mm. The tube 6 is bent into a U-shape and has legs 7 and 8 that are interconnected by a connecting member 9. The leg 7 has an inlet side for receiving the flow $\Phi$ to be measured and the leg 8 has an outlet side for the flow $\Phi$ to be measured. The connecting member 9 supports resistance elements 10 and 11 which are in thermally well-conducting contact with the connecting member. In FIG. 1, the resistance elements are constructed as electrical windings provided around the connecting member 9. The invention, however, is not limited to this embodiment. During assembly the sensor tube 6 is laid with its electrical resistance elements 10, 11 in channels provided in the inner surface 4 of the housing part 2. The main surface of the U-shaped tube is thus parallel to the inner surface of the housing part 2 (and after assembly also to the inner surface of the housing part 3). The pattern of channels in the housing part 2 follows the U-shape of the tube 6. The pattern of channels comprises channels of different widths and depths. All this is clearly shown in FIG. 2, which is a cross-sectional view from above of the housing part 2 of FIG. 1.

The channels 12 and 13, into which the bends 14 and 15 of the U-shaped tube fit, are of major importance for the embodiment shown here. The channels 12 and 13 (and also the channels 12A and 13A in the housing part 3) have a bottom which is raised with respect to that of the adjoining channels and on which the bends rest so as to obtain a local thermal clamping-in after assembly. A wider and deeper channel 16 is present between the channels 12 and 13. This channel 16 surrounds the operational segment of the U-shaped tube 6 after assembly, i.e. that portion of the connecting limb 9 that lies between the sides of the electrical windings 10 and 11 that face away from one another. The operational segment lies entirely free from the walls and bottom of the channel 16 in this example. The width and depth of the channel 16 are preferably such that the operational segment is narrowly enclosed so as to ensure that the air in the channel is stationary as much as possible during operation. The distance between the resistance elements and the wall of the channel 16 is, for example, of the order of a few tenths of a millimeter. The legs 7, 8 of the tube 6 are guided adjacent their ends 19, 20 through channels 21, 22 that have a slightly greater depth than the channels 12, 13. As a result, the distance between the ends is fixed, which facilitates, for example, the assembly together with other components of a mass flow controller. The ends 19, 20 extend through sealing elements (gaskets) 23, 24, which may be made from an elastomer material, to the exterior (cf. FIG. 2).

The channels 12, 13 and 12A, 13A, in which the bends are clamped in, may advantageously have a flat bottom, and the channels 21, 22 and 21A, 22A, through which the tube ends are guided, may have a rounded bottom, but the invention is not limited to this.

The sensor tube 6 is brought into thermal contact with the housing parts 2, 3, i.e. is thermally clamped in, at the areas of its bends when the second housing part 3, which preferably has a pattern of channels corresponding to the pattern of channels of the first housing part 2, is placed on the first housing part 2 during final assembly. The housing parts are for this purpose fastened to one another by means of bolts (not shown) which are turned through the housing part 3 into tapped holes in the housing part 2. During clamping, the bends of the U-shaped tube 6 may become slightly deformed (flattened). The ends 19, 20 of the U-shaped tube 6 will project slightly from the assembled housing parts 2, 3 after assembly. Being guided by the channels 21, 22 in combination with the channels 21A, 22A, they have a fixed mutual distance at the exterior of the housing, so that the sensor 1 can be readily mounted on a base unit of a mass flow controller. The lower portions 30, 30' of the housing parts 2, 3 may be regarded as integrated base portions. They comprise fastening elements 31 and 31' provided with respective bores by means of which the housing parts 2, 3 can be mounted on a base of a mass flow controller. In FIG. 1, the channels in the inner surface 5 of the housing part 3 that correspond to the channels 12, 13, 16, 21, and 22 in the inner surface of the housing part 2 (the "counter-channels") have been given the reference numerals 12A, 13A, 16A, 21A, and 22A.

The housing parts 2, 3 each comprise, besides the pattern of channels for accommodating the U-shaped sensor tube, also a central cavity 25, 25A. These cavities offer space for providing a connection component such as a connection foil or a connection (printed circuit) board. Said connection component is visible in the construction of FIG. 2. At one side connection wires with the electrical windings are connected thereto, and at the other side thicker wires 27, 28, 29 provide the connection to external circuitry. The printed circuit board may be fastened to the legs. In case the sensor tube is comparatively thick, it may be thermally clamped in the housing 'below' (adjacent the outer side of) the printed circuit board.

Figure 2:
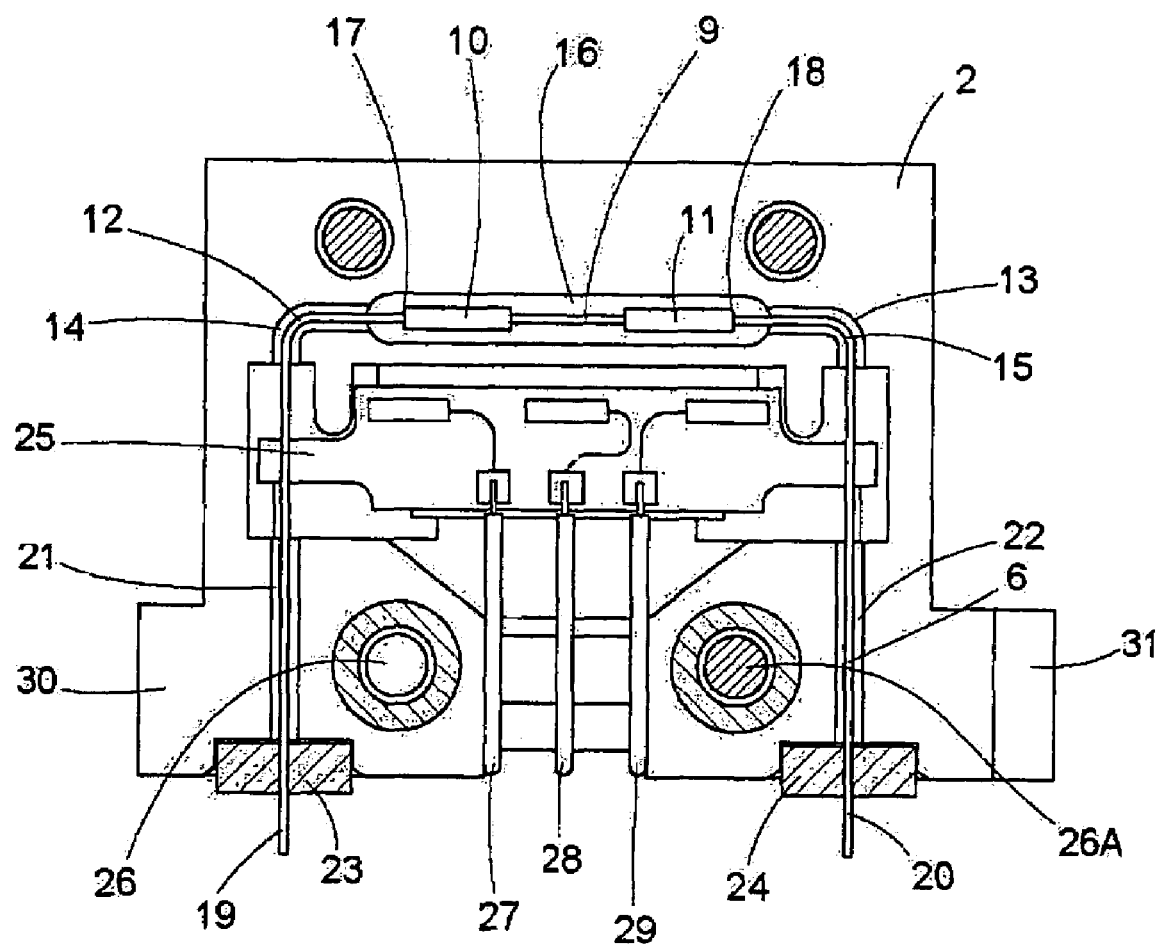
FIG. 2 is a cross-sectional view of one of the housing parts of FIG. 1 with the sensor tube of FIG. 1 mounted therein.
Figure 3:
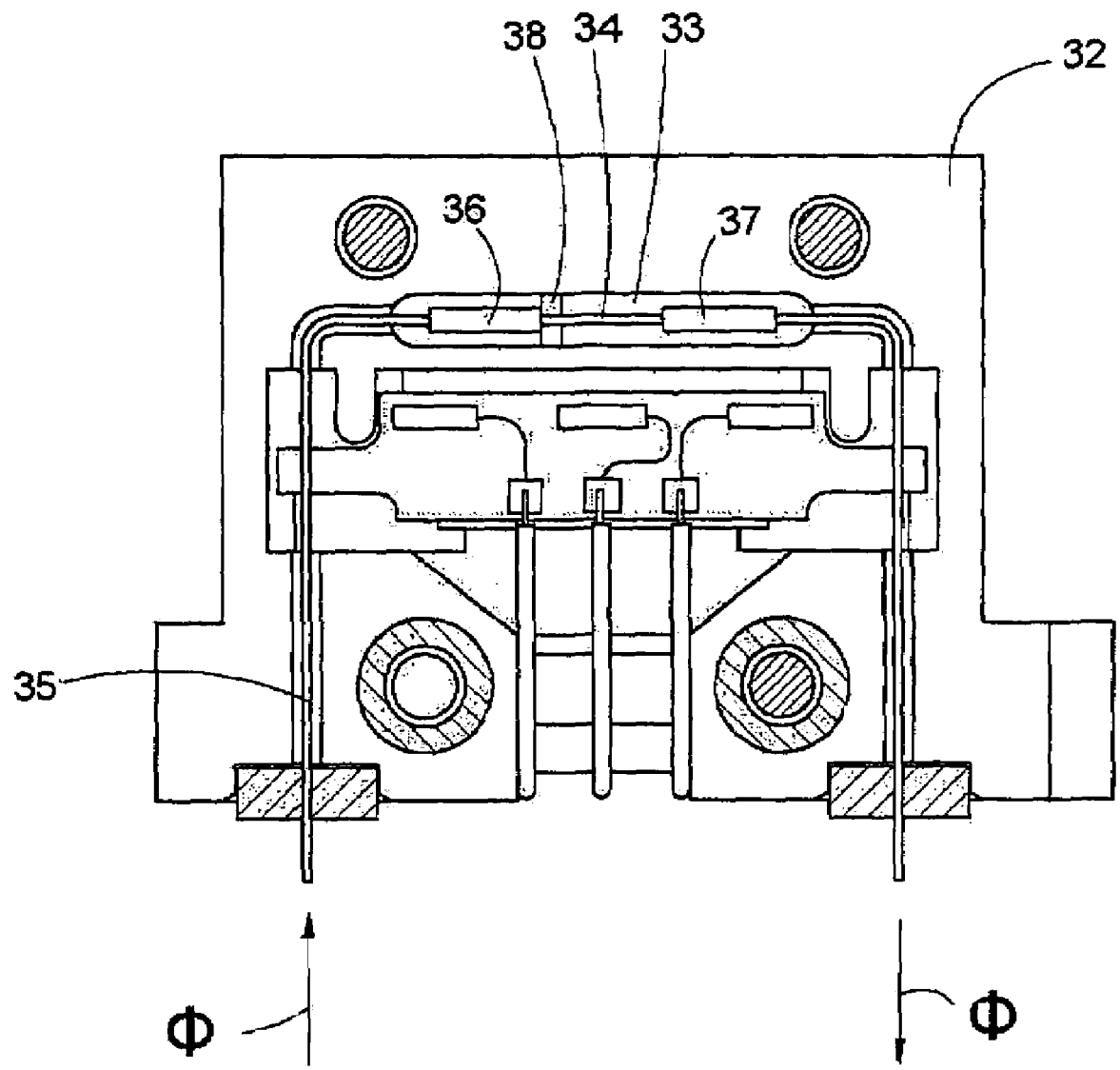
FIG. 3 is a cross-sectional view of an alternative embodiment of a housing part for a flow sensor according to the invention.

FIG. 3 is a cross-sectional view of an alternative embodiment of the housing part 2 of FIGS. 1 and 2.

The difference with the FIG. 2 construction is that in this case a channel 33, which encloses the operational segment 34 of the U-shaped sensor tube 35 in a location between the electrical resistance elements 36 and 37, is provided with an elevation 38 on which the operational segment 34 rests. When the housing part 32 is assembled together with a housing counterpart having a corresponding pattern of channels (not shown), the tube 35 will be thermally clamped in at a location between the electrical resistance elements 36 and 37.

In this manner heat is transferred from the tube to the housing between the windings 36 and 37 during operation, which is important for obtaining correct measuring values when the thermal flow sensor is operated by the CT method. If 36 denotes the sensor and 37 the heater, it is important for the location of thermal contact (the elevation) 38 of the housing part 32 and that of the housing counterpart 33 to be closer to the sensor 36 than to the heater 37 (preferably as close as possible to the sensor 36) so as to prevent any undesirable influence of the heater 37 on the sensor 36. All this is explained further with reference to FIG. 4.

The expression "U-shaped tube" denotes any configuration of two legs interconnected by a connecting limb, for example also configurations in which the legs are closer together adjacent their ends than at the connecting limb.

FIGS. 1 to 3 show the clamping-in at the areas of the bends of the U-tube. The clamping-in may alternatively be achieved in respective locations between the bends and the ends of the electrical resistance elements, or in respective locations between the bends and the inlet and outlet sides of the legs.

FIG. 4A is a diagrammatic longitudinal sectional view of a two-part housing 38 for a flow sensor according to the invention, and FIG. 4B is a cross-sectional view taken on the line IV in FIG. 4A. A housing part 39 is shown, provided with recesses (channels) in which a U-shaped sensor tube 40, provided with two adjoining electrical resistance elements A and B, is accommodated. The sensor tube 40 has two bends 41 and 42. These lie free with the portions of the tube 40 provided with the resistance elements A, B in this embodiment (i.e. without making contact with the walls) inside respective recesses (channels) 43, 44 in the inner surface of the housing part 39. Between the recesses 43, 44, the tube 40 rests in a shallower recess 45 in the inner surface. Such a shallower recess is also present in the housing counterpart 39' (FIG. 4B), so that the tube 40 will be locally clamped in between the housing parts when the latter are assembled together, and heat from the tube can be directly transferred to the housing, as is desired for improving the CT method.

FIG. 4A further shows that the U-shaped tube 40 has legs 46, 47 which are accommodated in shallow recesses 48, 49 at the sides of the bends 41, 42 remote from the respective resistance elements A, B, such that the legs are thermally clamped in below the bends when the housing part 39 is joined to a housing counterpart 39' (FIG. 4B), with the result that external temperature gradients cannot reach the operational segment of the tube 40, which lies between the sides of the resistance elements A and B that face away from one another. For comparison: the sensor tube in FIGS. 1 to 3 is thermally clamped in at the areas of the bends.

As FIGS. 4A and 4B show, the housing 38 comprising the housing parts 39 and 39' rests on a base 61. The legs 46, 47 of the tube 40, which extend freely through a central cavity 62, are passed to the exterior through ducts 50, 51 in the base 61. The base 61 may be a separate component or a component integral with the housing parts 39, 39'. The base 61 may be provided with elevations at its inside on which a printed circuit board with the necessary circuits may rest.

FIG. 5A, which is a diagrammatic longitudinal sectional view of a housing for a flow sensor according to the invention, and FIG. 5B, which is a cross-sectional view taken on the line V in FIG. 5A, present an alternative to the construction shown in FIGS. 4A and 4B, in which alternative the legs 52, 53 of the U-shaped tube 54 are clamped in over a greater length in that the legs 52, 53 are held in (shallow) channels 55, 56 which are longer than the channels 48, 49 in the construction of FIGS. 4A, 4B.

In FIG. 5A, the channels 55, 56 in the inner surface of the housing part 60 extend from the lower sides of the bends right through to the base 59. As in the construction of FIG. 4, a thermal clamping-in of the sensor tube 54 may again be provided between the resistance elements A' and B' also in this construction.

The expression "U-shaped tube" denotes any configuration of two legs interconnected by a connecting limb, for example also configurations in which the legs are closer together adjacent their ends than at the connecting limb.

FIGS. 1 to 3 show a clamping-in at the areas of the bends of the U-tube. The clamping-in may alternatively be provided in respective locations between the bends and the ends of the electrical resistance elements, or in respective locations between the bends and the inlet and outlet sides of the legs.

Generally speaking, the tube is preferably thermally clamped in there where the temperature profile just ends. In other words: a tube's clamping-in is dependent on the heat profile of the sensor (or in fact the windings thereof).

Further specific aspects of the flow sensor according to the invention are: there are two windings (resistance elements) which are located next to one another on the connecting limb, preferably symmetrically with respect to the center of the connecting limb. The housing parts form a housing wherein the connecting leg lies uppermost during operation, such that a temperature gradient in the base (against which the sensor is tightly screwed) is evened out before the operational part of the sensor is reached.

The expression "local clamping in" herein denotes clamping in over a portion of the relevant available path, for example over a portion of the path between the inlet side of the sensor tube and the upstream resistance element or over a portion of the path between the outlet side of the sensor tube and the downstream resistance element.

The invention claimed is:

1. A flow sensor of the thermal type comprising:
a U-shaped sensor tube with two legs and a connecting limb with two adjoining electrical resistance elements, and with a housing on a base, in which the U-shaped sensor tube has an inlet side where flow enters and an outlet side where flow exits,
wherein the housing comprises a first and a second housing part of a thermally well-conducting material, each with an inner surface provided with cavities and with an outer surface,
the first and second housing parts are arranged with their inner surfaces against each other, while the U-shaped sensor tube has a main surface that extends parallel to the inner surfaces, and the first and second housing parts surround the connecting limb and legs of the U-shaped sensor tube,
wherein the connecting limb is connected to the legs via bends, and the legs are held in channels in the inner surfaces of the first and second housing parts which extend from the lower sides of the bends right through to the base, and which legs are thermally clamped between the first and second housing parts along their length.

2. The flow sensor as claimed in claim 1, wherein the U-shaped sensor tube makes no contact with the first and second housing parts between its inlet side and the upstream resistance element and between its outlet side (20) and the downstream resistance element (11), except for those locations where it is thermally clamped.

3. The flow sensor as claimed in claim 2, wherein the connecting limb of the U-shaped sensor tube with the resistance elements provided thereon is narrowly enclosed by mutually facing cavities in inner surfaces of the first and second housing parts.

4. The flow sensor in claim 3, wherein the mutually facing cavities are channels in the inner surfaces of the first and second housing parts.

5. The flow sensor as claimed in claim 1, wherein cavities in the inner surface of the first housing part and cavities in the inner surface of the second housing part constitute channels that correspond with one another two-by-two, said channels being shallower in locations where the U-shaped sensor tube is thermally clamped, than in areas in which the U-shaped sensor tube is not thermally clamped.

6. The flow sensor as claimed in claim 5, wherein the connecting limb of the U-shaped sensor tube with the resistance elements provided thereon is narrowly enclosed by mutually facing cavities in inner surfaces of the first and second housing parts.

7. The flow sensor in claim 6, wherein the mutually facing cavities are channels in the inner surfaces of the first and second housing parts.

8. The flow sensor as claimed in claim 1, wherein the connecting limb of the U-shaped sensor tube with the resistance elements provided thereon is narrowly enclosed by mutually facing cavities in inner surfaces of the first and second housing parts.

9. The flow sensor in claim 8, wherein the mutually facing cavities are channels in the inner surfaces of the first and second housing parts.

10. The flow sensor as claimed in claim 1, wherein the connecting limb of the U-shaped sensor tube is thermally clamped between the first and second housing parts in a location between the two electrical resistance elements.

11. The flow sensor as claimed in claim 1, the first and second housing part each comprises a base portion, and legs of the U-shaped sensor tube are passed to the exterior through cavities arranged two-by-two opposite one another in the base portions of each housing part.

12. The flow sensor as claimed in claim 1, wherein the first and the second housing parts are manufactured from a metal alloy by means of die casting.

* * * * *